United States Patent Office 2,721,966
Patented Oct. 25, 1955

2,721,966

MANUFACTURE OF DRY SURFACE CONTACT RECTIFIERS

Alexander Jenkins and Leslie Hurst Peter, London, England, assignors to Westinghouse Brake and Signal Company Limited, London, England No Drawing. Application January 19, 1951, Serial No. 206,912

Claims priority, application Great Britain June 22, 1950

4 Claims. (Cl. 317—238)

This invention relates to the manufacture of dry surface contact rectifiers and has for its object to provide improved rectifiers of this character which will withstand comparatively high operating temperatures.

The field of application of known forms of dry surface contact rectifier, such as the selenium and copper oxide rectifiers, is limited by their high negative temperature-resistance coefficients and by their increased rate of ageing at high temperature. These characteristics cause a decrease in the reverse resistance of the rectifier and an increase in its forward resistance.

The heat resisting properties of ceramic materials composed of titanium dioxide together with various proportions of other metallic oxides have long been known and such mixtures are extensively used in the manufacture of insulating ceramic bodies for condensers. It is also known that, by appropriate heat treatments, such ceramic materials can be converted to a semi-conducting state. Asymmetric devices have been produced comprising a body of semi-conducting titanium dioxide, sometimes referred to as "blue" titanium dioxide, having silver electrodes volatilised on to opposite surfaces, one of which made direct contact with the silver whilst the other had a thin film of an insulating compound such as silica between it and the other silver electrode. This device gave rectifying ratios up to 100:1, but its resistance in the low resistance direction of current flow was too high for the device to be of commercial use. Later a rectifier was produced comprising an iron plate on which was a layer of titanium oxide on top of which was applied a silver counter electrode. This rectifier, however, was found to age badly and to be expensive to produce.

There appears to be a limited number of metals from which to select the necessary counter-electrode material for use in a titanium dioxide rectifier and that, provided a suitable counter-electrode material is chosen, good rectifiers may be produced by treating a surface of a semi-conducting body of titanium dioxide of non-stoichiometric composition so as to make good the oxygen deficiency in that surface and applying the counter-electrode to that surface.

It has now been found that rectifiers having still better characteristics may be obtained if, instead of merely making good the oxygen deficiency in the surface of the semi-conducting titanium dioxide, a barrier layer of a metal titanate is formed in or on that surface and the counter-electrode subsequently applied to the barrier layer.

According to the invention, a process for the manufacture of a dry surface contact rectifier includes the steps of providing a semi-conducting body composed wholly or mainly of titanium-dioxide of non-stoichiometric composition having in or on a surface thereof a metal titanate barrier layer and subsequently applying to that layer a counter-electrode composed wholly or mainly of a metal selected from a group consisting of thallium, tellurium, gold, palladium, lead, bismuth, silver, cadmium, nickel, copper, tin, alkali metal, arsenic, antimony, carbon, cobalt, gallium, indium, iron, or alloys thereof.

Preferably the counter-electrode is composed wholly or mainly of thallium, tellurium, gold, palladium, lead, bismuth, or alloys thereof.

We wish it to be understood that metal titanates are included in the term "mainly titanium dioxide." In other words, the titanium dioxide ($TiO_2$) may be present either as a compound in definite chemical proportions, as in a metal titanate (for example $CuTiO_3$) or as an indefinite mixture of two or more oxides (such as $x(CuO) + y(TiO_2)$ where $x$ and $y$ may each have a value other than unity.

The titanate may be formed in or on the surface of a body of semi-conducting titanium-dioxide by applying to that surface a substance which, upon being heated, will react with the titanium-dioxide, heating the body in a substantially oxygen-free atmosphere until the reaction has taken place, and then cooling in an oxygen-bearing medium, such as, for example, air or hydrogen peroxide, the counter-electrode being subsequently applied to the surface of the resultant titanate.

By the term "substantially oxygen-free" is meant less than 20% oxygen by volume, but we prefer the atmosphere in which the heating takes place to be as free from oxygen as possible.

As a modification of the above method, the substance may be applied to the surface of a body of insulating titanium-dioxide and the whole subjected to the same heat treatment, the heating being carried out in an atmosphere capable of reducing titanium dioxide, hereinafter termed "a reducing atmosphere" in order to reduce the titanium dioxide to its non-stoichiometric, semi-conducting, state whilst the reaction with the applied substance takes place at its surface.

It is believed that the reaction between the titanium-dioxide and the applied substance under either of the above conditions produces a layer of oxygen deficient, non-stoichiometric, metal titanate which, when cooled in the oxygen bearing medium, is converted to its stoichiometric state, thus forming the desired barrier layer.

In another method of carrying out the invention the substance is applied to the surface of a body of titanium metal which is then treated by the same heat treatment as described above. In order to economise in the amount of titanium used, a layer of this metal may be deposited upon the surface of a plate or disc of cheaper metal, such as copper or iron, prior to the application of the substance.

In any of the above methods, any substance may be employed which, on the application of heat in the presence of oxygen will react with titanium or titanium-dioxide to form a metal titanate.

Copper, in both its metallic form and as a compound has proved to be very suitable and according to one embodiment of the invention a layer of copper is deposited upon one surface of a wafer of titanium dioxide in its semi-conducting form. The whole is then heated in an atmosphere of hydrogen to a temperature of about 1000° C. for from 1 to 15 minutes, according to the thickness of the copper layer, and then cooled in air. A counter-electrode of thallium is subsequently applied by spraying and the rectifier is completed by applying a suitable contact electrode in a known manner to the opposite surface of the titanium-dioxide wafer. The copper may be deposited in the form of a metallic copper or, for example, in the form of copper nitrate. In the latter case, the titanium dioxide wafer may be dipped in a concentrated solution of copper nitrate and, after withdrawal, the solution allowed to dry upon the surface of the wafer to leave a thin layer of crystalline copper nitrate. The above mentioned heat treatment is then carried out and the counter-electrode and contact electrode are applied in the usual manner.

It is believed that, during the heating, the copper diffuses into the titanium dioxide and reacts with the titanium dioxide to form a copper titanate but that, owing to the lack of oxygen in the atmosphere in which the heating is carried out the copper titanate is in an oxygen-deficient or non-stoichiometric semi-conducting form, and that the subsequent cooling in air makes good this oxygen deficiency at least at the surface of the copper titanate, converting it to its stoichiometric, substantially insulating or high resistance form thus producing the required barrier layer. It may be mentioned that a substantially oxygen free atmosphere is necessary during the heating of the wafer in order to prevent the semi-conducting titanium dioxide from reverting to a high resistance form.

As previously mentioned, the same process may be applied to a wafer of titanium dioxide in an insulating form, provided that the heating is carried out in a reducing atmosphere or one of low partial pressure of oxygen in order to convert the titanium dioxide to its semi-conducting form.

Other substances which may be used instead of copper or copper compounds are certain metal oxides which, when applied to the surface of the wafer and heated to a high temperature, form titanates. Examples of these oxides, together with the temperature at which the reaction takes place are magnesium oxide (725° C.), zinc oxide (700° C.), lead monoxide (470° C.) and ferrous oxide (700° C.). It has been observed, however, that aluminium oxide and stannic oxide are not suitable for this process, probably on account of their inability to produce titanates by this reaction.

Other suitable compounds are sodium hydroxide, which at a temperature above 318° C. fuses with the titanium dioxide to form sodium titanate; sodium carbonate which fuses with titanium dioxide at a temperature above 850° C. to form also sodium titanate.

Metal halides may also be used in the same manner. Examples of suitable halides are manganese chloride, zinc fluoride, magnesium chloride, manganese fluoride, sodium chloride and potassium iodide. Of these the magnesium chloride requires the presence of magnesium oxide, while sodium chloride and potassium iodide require the presence of oxygen during the heating.

It is found that if oxygen bearing compounds of barium, strontium or calcium are employed, the resulting metal titanate is in its substantially insulating or high resistance form and accordingly does not require to be cooled in an oxygen bearing medium.

In the case of a process in which the substance is applied to the surface of a body of titanium metal, it is thought that, upon heating, an alloy or compound is formed which, upon being cooled in the oxygen bearing medium, is converted to a metal titanate of stoichiometric, substantially insulating or high resistance composition at the surface, whilst immediately beneath this surface layer is formed titanium dioxide to a depth dependent upon the depth of penetration of the oxygen into the titanium.

According to another embodiment of the invention, a body of a metal titanate in its substantially insulating or very high resistance stoichiometric form is reduced to its semi-conductive, non-stoichiometric form one surface thereof then being treated so as to produce in or on that surface a layer of the material in its substantially insulating or high resistance stoichiometric form, a counter-electrode of previously specified material being applied to the surface of that layer.

It is to be understood that the barrier layer may consist of a mixture of two or more different metal titanates formed either by a number of successive heat treatments, each as described hereinbefore, or by one treatment using, for example, an alloy of two metals or a mixture of their compounds.

Having thus described our invention, what we claim is:

1. A dry surface contact rectifier comprising in combination a semi-conducing body composed at least mainly of titanium dioxide of non-stoichiometric composition, a barrier layer composed of a metal titanate formed at the surface of said semi-conducting body, and a counter-electrode composed at least mainly of an element selected from the group consisting of thalliulm, tellurium, gold, palladium, lead, bismuth, silver, cadmium nickel, copper, tin, alkali metals, arsenic, antimony, carbon, cobalt, gallium, indium and iron, applied to said barrier layer.

2. A dry surface contact rectifier according to claim 1 in which the barrier layer is composed of a stoichiometric metal titanate selected from the group consisting of copper titanate, magnesium titanate, zinc titanate, lead titanate, ferrous titanate, sodium titanate, manganese titanate, potassium titanate, barium titanate, strontium titanate, and calcium titanate.

3. A dry surface contact rectifier comprising in combination a semi-conducting body composed at least mainly of titanium dioxide of non-stoichiometric composition, a barrier layer composed of a metal titanate formed at the surface of said semi-conducting body, and a counter-electrode composed at least mainly of an element selected from the group consisting of thallium, tellurium, gold, palladium, lead, and bismuth, applied to said barrier layer.

4. A dry surface contact rectifier according to claim 3 in which the barrier layer is composed of a stoichiometric metal titanate selected from the group consisting of copper titanate, magnesium titanate, zinc titanate, lead titanate, ferrous titanate, sodium titanate, manganese titanate, potassium titanate, barium titanate, stronium titanate, and calcium titanate.

References Cited in the file of this patent

UNITED STATES PATENTS

| | | |
|---|---|---|
| 2,019,096 | Rother | Oct. 29, 1935 |
| 2,060,905 | Smith | Nov. 17, 1936 |
| 2,162,362 | Smith | June 13, 1939 |
| 2,444,473 | Skinker | July 6, 1948 |
| 2,452,603 | Saslaw | Nov. 2, 1948 |
| 2,695,380 | Mayer et al. | Nov. 23, 1954 |